(12) United States Patent
Wakabayashi et al.

(10) Patent No.: US 9,731,665 B2
(45) Date of Patent: Aug. 15, 2017

(54) PROTECTOR AND WIRE HARNESS

(71) Applicant: Sumitomo Wiring Systems, Ltd., Yokkaichi, Mie (JP)

(72) Inventors: Masataka Wakabayashi, Mie (JP); Minoru Fukuda, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 15/174,295

(22) Filed: Jun. 6, 2016

(65) Prior Publication Data
US 2016/0365170 A1 Dec. 15, 2016

(30) Foreign Application Priority Data

Jun. 10, 2015 (JP) .................................. 2015-117443

(51) Int. Cl.
*H02G 3/04* (2006.01)
*B60R 16/02* (2006.01)

(52) U.S. Cl.
CPC ................................ *B60R 16/0215* (2013.01)

(58) Field of Classification Search
USPC ........................................................ 174/70 R
See application file for complete search history.

(56) References Cited

U.S. PATENT DOCUMENTS

| | | | | |
|---|---|---|---|---|
| 5,681,654 A | * | 10/1997 | Mamish | ................. C09J 7/0296 428/354 |
| 2003/0207106 A1 | * | 11/2003 | Nakamura | .......... B60R 16/0215 428/355 EN |
| 2004/0168815 A1 | * | 9/2004 | Ohtsubo | ............... B29C 61/065 174/36 |
| 2009/0229880 A1 | | 9/2009 | Watanabe | |

FOREIGN PATENT DOCUMENTS

| | | |
|---|---|---|
| JP | 08317526 A * | 11/1996 |
| JP | 2015080293 A | 4/2015 |
| JP | 2015082955 A | 4/2015 |
| WO | WO2011102005 A1 | 8/2011 |

OTHER PUBLICATIONS

European Search Report for Application No. 14865885.9 Dated Sep. 15, 2016, 7 Pages.

* cited by examiner

*Primary Examiner* — Timothy Thompson
*Assistant Examiner* — Krystal Robinson
(74) *Attorney, Agent, or Firm* — Reising Ethington P.C.

(57) ABSTRACT

A protector and wire harness according to which, if human labor is used to place a group of electrical lines on a flat plate and wrap adhesive tape around the group of electrical lines and tape fixing portions, it is possible to enclose and protect the group of electrical lines with the flat plate without depending on human labor. The protector is made of a shape-memory polymer sheet with Tg set to a temperature higher than the high temperature reached in summer, and is constituted by a tube-forming flat surface portion and tape fixing portions. The tube-forming flat surface portion is formed with a rectangular shape having a width for folding into a tube shape that allows a group of electrical lines to be inserted and concealed therein, and is shaped as a flat plate with a tape fixing portion extending from at least one end in the lengthwise direction.

4 Claims, 8 Drawing Sheets

PROTECTOR AND WIRE HARNESS

This application claims the benefit of Japanese Application No. JP2015-117443, filed on Jun. 10, 2015, the contents of which are hereby incorporated by reference in their entirety.

FIELD

The present invention relates to a protector and a wire harness.

BACKGROUND

Conventionally, depending on the location where a wire harness is installed, there is demand for electrical lines or the like to be protected from metal edges and the like of the vehicle body, and a protector is attached to the wire harness trunk line. There are various methods for attaching a protector to a wire harness trunk line (e.g., see JP 2015-82955A and JP 2015-80293A, which are hereinafter respectively called Patent Documents 1 and 2).

FIGS. 7a-7c are diagrams showing a protector that is the same as the protector in FIG. 3 disclosed in Patent Document 1, which is conventional technology. A protector 30 in this figure includes a sheet-shaped resin substrate 36 that is partitioned into four rectangular surface portions 32 to 35 in the width direction by three folding lines 31. A group of electrical lines 38 that is partially bound at multiple locations using pieces of adhesive tape 37 is placed on, out of the four surface portions 32 to 35, the surface portion 33 whose two end portions are tape fixing portions 33a that are longer than the two end portions of the other surface portions. The tape fixing portions 33a at the two ends of the surface portion 33 are fixed to the group of electrical lines 38 using pieces of adhesive tape 39, the remaining three surface portions 32, 34, and 35 are folded at the folding lines 31 so as to form a quadrangular tube shape, and lastly, adhesive tape (not shown) is loosely wrapped around the protector to maintain the quadrangular tube shape.

FIG. 8 is a diagram showing a protector that is the same as the protector in FIG. 1 disclosed in Patent Document 2, which is conventional technology. A protector 40 in this figure includes a protector main body 41, which has a groove-shaped recessed portion in which a group of electrical lines is accommodated and tape fixing portions at the two ends of the recessed portion, a cover portion 43 connected to one side of the open side of the protector main body 41 via a hinge portion 42, and lock means 140 that are provided as pairs of male and female members on the protector main body 41 and the cover portion 43 and that lock when the cover portion 43 is closed.

However, the protectors disclosed in Patent Documents 1 and 2 have problems such as the following.

The protector 30 disclosed in Patent Document 1 uses a sheet-shaped resin substrate 36, and therefore the resin substrates 36 can be stored in a stacked state after blank layout and molding, but it is necessary to perform human labor steps of folding the three surface portions 32, 34, and 35 at the folding lines 31 to form a quadrangular tube shape, and then loosely wrapping adhesive tape around the protector to maintain the quadrangular tube shape.

On the other hand, according to the protector 40 disclosed in Patent Document 2, it is necessary to perform human labor steps for closing the cover portion 43 and locking the lock means 140 provided as pairs of male and female members. Also, the protector 40 disclosed in Patent Document 2 is an extrusion-molded body, requires a mold, and is a three-dimensional object rather than being sheet-shaped, and therefore a large space is required for storage between being manufactured as an extrusion-molded body and being attached to electrical lines.

The present design has been achieved in light of the situation described above, and an object thereof is to provide a protector and a wire harness according to which, if human labor is used to place a partially bound group of electrical lines on a flat plate-shaped protector and then wrap tape around the group of electrical lines and tape fixing portions provided on the protector, it is possible to thereafter enclose and protect the group of electrical lines without depending on human labor.

SUMMARY

In order to solve the above-described issues, a protector according to one aspect is made of a shape-memory polymer sheet with a glass transition point temperature Tg set to a temperature higher than a high temperature reached in summer, and constituted by a tube-forming flat surface portion and a tape fixing portion extending from the tube-forming flat surface portion, the tube-forming flat surface portion being formed with a predetermined rectangular shape having a width for being folded into a tube shape that allows a group of electrical lines to be inserted and concealed therein, and being shaped as a flat plate with a tape fixing portion extending from at least one end in a lengthwise direction, the protector being caused to form the tube shape and remember the tube shape at a predetermined temperature that is higher than the glass transition point temperature Tg, and then caused to return to the flat plate shape at a temperature in a vicinity of the glass transition point temperature Tg, and then fixed in the flat plate shape in a temperature range lower than the glass transition point temperature Tg.

According to the above configuration, the protector can be stored in a stacked state after being formed into a flat plate shape, and therefore needs only a small amount of storage space and can be stored and managed easily. With this protector, if human labor is used to place a partially bound group of electrical lines on a flat plate and then wrap tape around the group of electrical lines and a tape fixing portion provided on the flat plate, it is possible to, without depending on human labor, heat the protector to a predetermined temperature higher than the temperature Tg by sending it along a line that includes a heater so as to cause the protector to undergo restoration to the remembered tube shape and protect the group of electrical lines. In this way, the protector does not need human labor to be folded from a flat plate shape to the shape of a tube with the group of electrical lines inserted therein.

The shape-memory polymer sheet can be made of a shape-memory polymer with the glass transition point temperature Tg set to 80° C. or higher.

In order to solve the above-described issues, a wire harness according to one aspect includes: a group of electrical lines partially bound at a plurality of locations using adhesive tape; and the protector described above, wherein the group of electrical lines is placed on the protector, adhesive tape is wrapped around the group of electrical lines and the tape fixing portion, the protector is heated to a predetermined temperature higher than the glass transition point temperature Tg to cause the protector to undergo restoration to the remembered tube shape and protect the group of electrical lines.

According to the above configuration, with the wire harness, the protector does not need human labor to be folded from a flat plate shape to the shape of a tube with the group of electrical lines inserted therein.

Accordingly, it is possible to provide a protector and a wire harness according to which, if human labor is used to place a partially bound group of electrical lines on a flat plate and then wrap tape around the group of electrical lines and a tape fixing portion provided on the flat plate, it is possible to thereafter enclose and protect the group of electrical lines with the flat plate without depending on human labor.

DRAWINGS

DESCRIPTION

Hereinafter, an embodiment in which a protector is applied to a wire harness will be described with reference to the drawings.

First, the configuration will be described.

Figure 1:
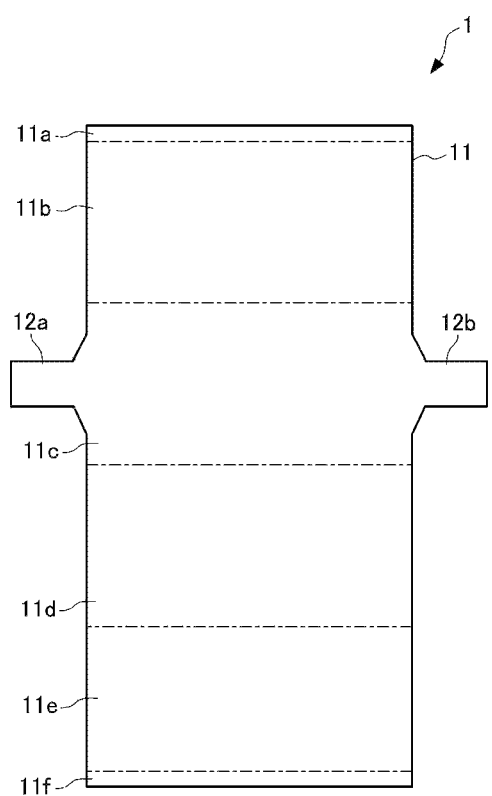
FIG. 1 is a plan view of a protector according to an embodiment.

As shown in FIG. 1, a protector 1 is made of a shape-memory polymer sheet, and is constituted by a tube-forming flat surface portion 11 and tape fixing portions 12a and 12b. The protector 1 is made of a shape-memory polymer with a glass transition point temperature Tg (e.g., 80° C.) set to a temperature higher than the high temperature reached in the summer.

The tube-forming flat surface portion 11 has an approximately rectangular shape overall, and has six surface portions 11a to 11f that are partitioned by five folding lines shown by dashed-dotted lines in FIG. 1. The four surface portions 11b to 11e have the same width dimension. The two surface portions 11a and 11f have a smaller width dimension than the four surface portions 11b to 11e.

Figure 2:
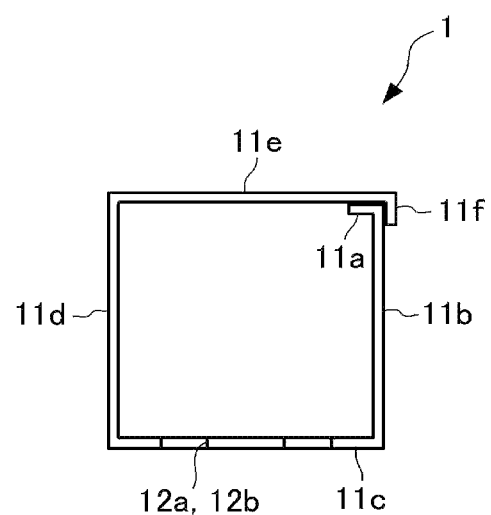
FIG. 2 is a cross-sectional view of a tube shape that the protector according to the embodiment is caused to remember.

The tube-forming flat surface portion 11 is obtained by folding the shape-memory polymer sheet at right angles at the five folding lines while at the glass transition point temperature Tg, at which the resin becomes soft, and thus, as shown in FIG. 2, the four surface portions 11b to 11e form a rectangular tube, and the two surface portions 11a and 11f are superimposed on each other. The size of the rectangular tube shown in FIG. 2 is set so as to allow gentle insertion of a group of electrical lines. Note that the two surface portions 11a and 11f are not essential. The tape fixing portions 12a and 12b extend from the two lengthwise end portions of the surface portion 11c that forms the rectangular tube. Note that a configuration is possible in which only one out of the tape fixing portions 12a and 12b is included at only one end of the protector 1 as the tape fixing portion.

The protector 1 is obtained by wrapping the four surface portions 11b to 11e around a rectangular column-shaped jig to form a rectangular tube as shown in FIG. 2 while at the glass transition point temperature Tg (e.g., 80° C.) at which the resin becomes soft, then superimposing the two surface portions 11a and 11f on each other and pressing them from the outside using a predetermined jig to fix the rectangular column shape. The rectangular column shape can be remembered by keeping the protector at a predetermined temperature higher than the temperature Tg (e.g., 90° C.) for a predetermined time. The temperature is then lowered to the temperature Tg at which the resin becomes soft, and the protector is opened to the flat shape shown in FIG. 1 and then cooled to room temperature so as to maintain the flat shape.

The shape-memory polymer sheet may be a resin sheet made of polynorbornene, trans-polyisoprene, a styrene-butadiene copolymer, or the like.

The temperature Tg needs to be set to a temperature higher than the high temperature during the summer in order to maintain the remembered rectangular tube shape even when the protector 1 is subjected to outside temperatures during the summer. In other words, if the protector 1 were caused to remember the rectangular tube shape with the temperature Tg set to a temperature (e.g., 50° C.) lower than the high temperature during the summer, the resin would soften when heated to Tg during the summer, the ability to hold the group of electrical lines would be lost, and the rectangular tube shape would conversely collapse when subjected to the weight of the group of electrical lines and the like. If further heated to a temperature higher than the temperature Tg, it would remember the shape formed after the collapse of the rectangular tube shape, and thereafter hold the shape formed after the collapse of the rectangular tube shape, thus losing functionality as a protector. Such a phenomenon does not occur if the temperature Tg is set to a temperature higher than the high temperature reached during the summer.

The temperature Tg of the shape-memory polymer sheet may be set to a temperature higher than 80° C.

Figure 5:
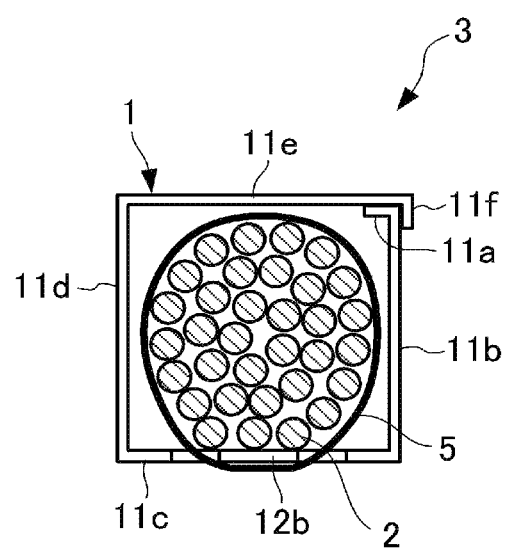
FIG. 5 is a cross-sectional view of a state after heating and cooling of the protector according to the embodiment.
Figure 6:
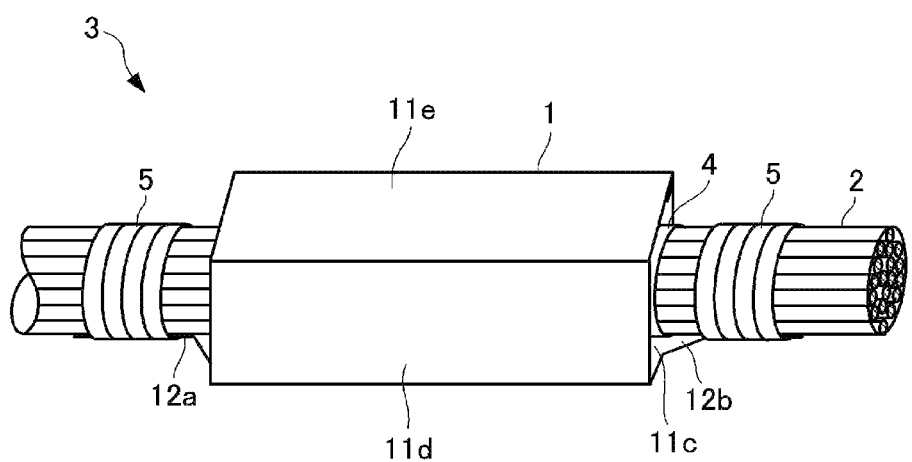
FIG. 6 is a perspective view of a wire harness according to the embodiment.
Figure 7A:
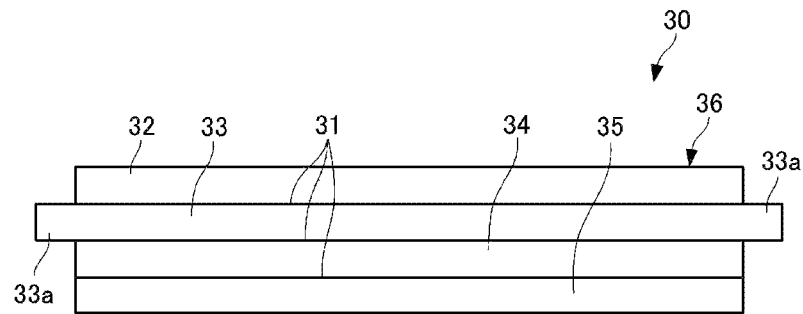
FIGS. 7a-7c are diagrams showing a protector that is the same as a conventional protector disclosed in Patent Document 1.
Figure 7B:
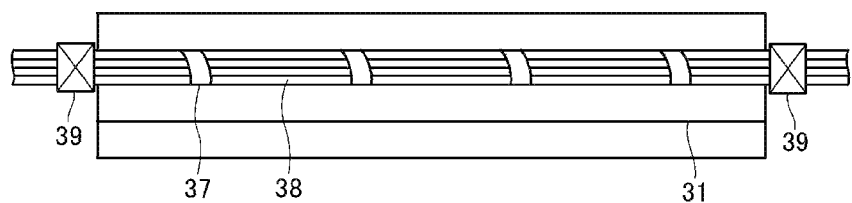
Figure 7C:
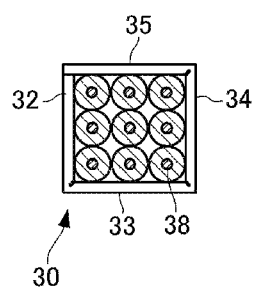
Figure 8:
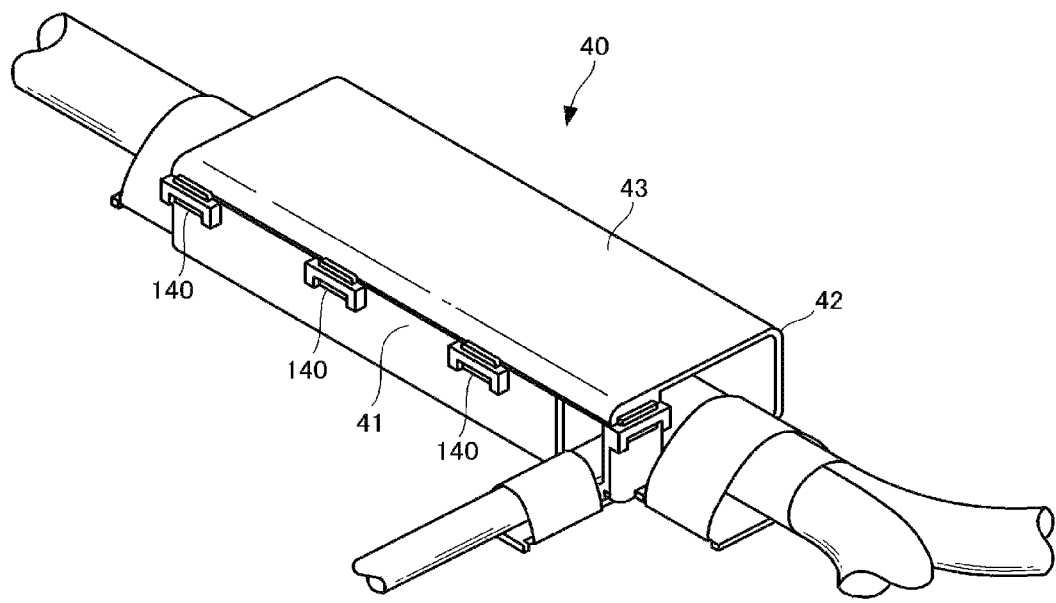
FIG. 8 is a diagram showing a protector that is the same as a conventional protector disclosed in Patent Document 2.

As shown in FIG. 6, a wire harness 3 includes the protector 1 shown in FIG. 1, in the rectangular tube shape shown in FIG. 5, and a group of electrical lines 2 inserted through the protector 1. The group of electrical lines 2 includes multiple electrical lines that are partially bound at multiple locations using pieces of adhesive tape 4. Pieces of adhesive tape 5 are wrapped around the tape fixing portions 12a and 12b of the protector 1 so as to bind and fix them to the group of electrical lines 2.

Next, a manufacturing method will be described.

FIGS. 3 to 6 show steps in which the group of electrical lines 2 is placed on the protector 1 made of a flat plate-shaped shape-memory polymer sheet, and the protector 1 is heated so as to form the protector 1 into a rectangular tube shape, thus protecting the group of electrical lines 2 with the protector 1 and completing the wire harness 3.

Figure 3:
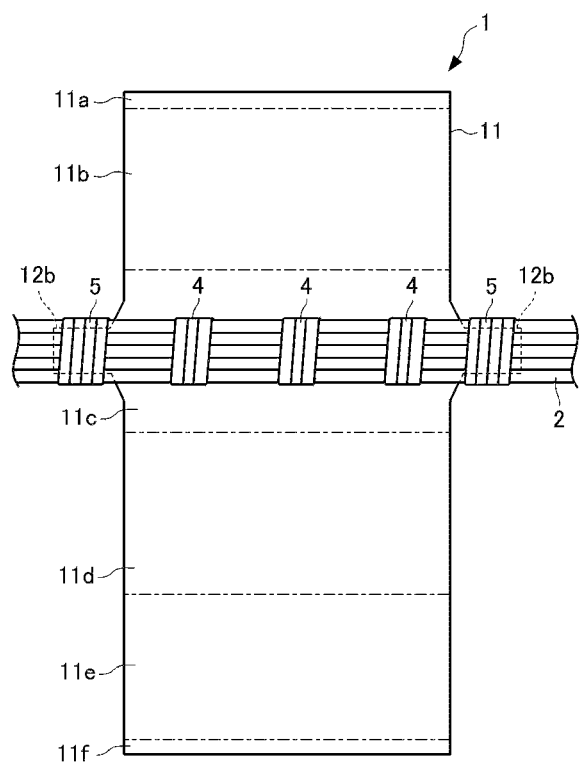
FIG. 3 is a plan view of a state in which a group of electrical lines according to the embodiment is placed on the protector according to the embodiment.

First, as shown in FIG. 3, the group of electrical lines 2 is placed on the tape fixing portions 12a and 12b of the flat plate-shaped protector 1, and the group of electrical lines 2 and the tape fixing portions 12a and 12b of the protector 1 are fixed to each other by wrapping pieces of adhesive tape 5 around them.

Figure 4:
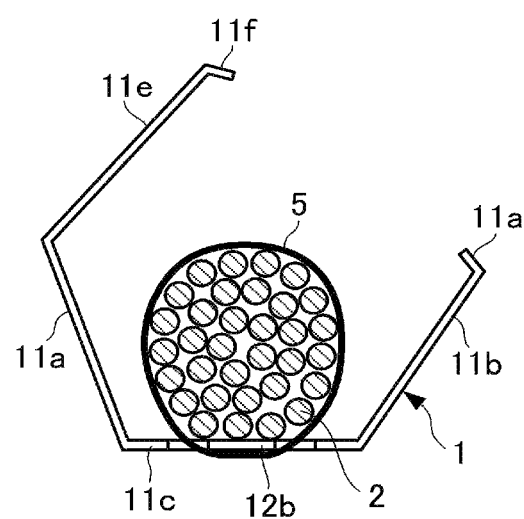
FIG. 4 is a cross-sectional view of a state during heating of the protector according to the embodiment.

Next, the surface of the protector 1 made of a shape-memory polymer sheet on the side not having the group of electrical lines 2 placed thereon is heated. The protector 1 remembers the rectangular tube shape shown in FIG. 2, and therefore when heated to the temperature Tg, it begins to fold at the locations indicated by the dashed-dotted lines in FIG. 1, gradually returns to the remembered shape as shown in FIG. 4, and ultimately becomes shaped as a rectangular tube as shown in FIG. 5.

When the protector 1 is cooled to room temperature thereafter, the rectangular tube shape becomes fixed as shown in FIG. 6. The wire harness 3 in which the group of electrical lines 2 are protected by the protector 1 restored to the rectangular tube shape is obtained as described above.

According to the protector 1 of the above-described embodiment and the wire harness 3 using the same, if human labor is used to place the partially bound group of electrical lines 2 on the flat plate-shaped protector 1 as shown in FIG. 3, and then wrap pieces of adhesive tape 5 around the group of electrical lines 2 and the tape fixing portions 12a and 12b provided on the protector 1 so as to be fixed to each other, human labor is not need thereafter. Specifically, thereafter, as shown in FIGS. 4 to 6, by merely heating and cooling the protector 1, the protector 1 undergoes deformation to a rectangular tube shape due to its shape restoration function, and encloses the group of electrical lines 2 in the lengthwise direction, thus protecting the group of electrical lines 2 and completing the wire harness 3. The protector 1 does not open after restoration to the rectangular tube shape, and therefore there is no need for the human labor of forming a flat plate-shaped protector into a rectangular tube shape and then loosely wrapping adhesive tape around the protector, as with the protector 30 of Patent Document 1.

As described above, the present invention may have an effect according to which, if human labor is used to place a partially bound group of electrical lines on a flat plate-shaped protector and then wrap tape around the group of electrical lines and tape fixing portions provided on the protector, it is possible to thereafter enclose and protect the group of electrical lines without depending on human labor. The present invention may therefore be useful to a protector and a wire harness that includes this protector.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A protector made of a shape-memory polymer sheet with a glass transition point temperature Tg set to a temperature higher than 50° C., and constituted by a tube-forming flat surface portion and a tape fixing portion extending from the tube-forming flat surface portion, the tube-forming flat surface portion being formed with a predetermined rectangular shape having a width and a plurality of lengthwise edges for being folded into a rectangular tube shape that allows a group of electrical lines to be inserted and concealed therein, and being shaped as a flat plate with the tape fixing portion extending from at least one end in a lengthwise direction, the protector being caused to form the rectangular tube shape with the plurality of lengthwise edges and to remember the rectangular tube shape with the plurality of lengthwise edges at a predetermined temperature that is higher than the glass transition point temperature Tg, and then caused to return to the flat plate shape at a temperature in a vicinity of the glass transition point temperature Tg, and then fixed in the flat plate shape in a temperature range lower than the glass transition point temperature Tg.

2. The protector according to claim 1, wherein the shape-memory polymer sheet is made of a shape-memory polymer with the glass transition point temperature Tg set to 80° C. or higher.

3. A wire harness comprising:
a group of electrical lines partially bound at a plurality of locations using adhesive tape; and
the protector according to claim 2,
wherein the group of electrical lines is placed on the protector, adhesive tape is wrapped around the group of electrical lines and the tape fixing portion, the protector is heated to a predetermined temperature higher than the glass transition point temperature Tg to cause the protector to undergo restoration to the remembered rectangular tube shape with the plurality of lengthwise edges and to protect the group of electrical lines.

4. A wire harness comprising:
a group of electrical lines partially bound at a plurality of locations using adhesive tape; and
the protector according to claim 1,
wherein the group of electrical lines is placed on the protector, adhesive tape is wrapped around the group of electrical lines and the tape fixing portion, the protector is heated to a predetermined temperature higher than the glass transition point temperature Tg to cause the protector to undergo restoration to the remembered rectangular tube shape with the plurality of lengthwise edges and to protect the group of electrical lines.

* * * * *